US007747469B2

(12) United States Patent
Hinman

(10) Patent No.: US 7,747,469 B2
(45) Date of Patent: Jun. 29, 2010

(54) SYSTEM AND METHOD FOR A MADE TO SPECIFICATION E-COMMERCE QUOTING AND ORDERS PROCESSING SYSTEM ON A STAND ALONE OR INTEGRATED PORTAL

(76) Inventor: Lee M Hinman, 234 Twin Lakes Dr., Panama City Beach, FL (US) 32413

( * ) Notice: Subject to any disclaimer, the term of this patent is extended or adjusted under 35 U.S.C. 154(b) by 1032 days.

(21) Appl. No.: 10/812,998

(22) Filed: Mar. 31, 2004

(65) Prior Publication Data
US 2005/0234752 A1 Oct. 20, 2005

(51) Int. Cl.
*G06Q 30/00* (2006.01)
(52) U.S. Cl. .......................................... 705/26; 705/37
(58) Field of Classification Search ................... 705/26, 705/37
See application file for complete search history.

(56) References Cited
U.S. PATENT DOCUMENTS

| | | | | |
|---|---|---|---|---|
| 6,167,383 | A * | 12/2000 | Henson ........................ | 705/26 |
| 7,305,671 | B2 * | 12/2007 | Davidov et al. .............. | 717/172 |
| 2002/0055956 | A1 * | 5/2002 | Krasnoiarov et al. ......... | 707/513 |
| 2002/0152133 | A1 * | 10/2002 | King et al. .................... | 705/26 |
| 2003/0028451 | A1 * | 2/2003 | Ananian ....................... | 705/27 |

OTHER PUBLICATIONS

Parametric Shopping Cart, User Documentation, version 2.101, downloaded from the Internet www.archive.org, on Mar. 28, 2007, http://web.archive.org/web/ 20030627195753/http://www.srifl.com/pscdemo/PSC_Doc_RunTimeOnly.html#AEN36. 11 pages.*
Press Release from www.prweb.com, dated Nov. 2003, downloaded from ProQuest Direct on the Internet on Sep. 13, 2009, 1 page.*

* cited by examiner

*Primary Examiner*—James Zurita

(57) ABSTRACT

Defining product specifications via XSD/XSL/DTD file with responses to option variable questions. The option selections have user defined interrelationship and cross checking between options. XSL file includes functions to compute selling price, shipping cost, sales tax and other fields. System provides links to assist with input. Responses and Real time Scalable Vector Graphic (SVG) layout are retained in XML format in a single table within the database. The final checout order occurs when update cart has been successfully completed without errors. A system defined allowed number of suppliers can be selected to provide quotes. The returned quoted price is displayed to the buyer who selects the supplier and awards the contract. The buyer continues on to the awarded supplier's site for completion of credit processing information to complete the commerce transaction. The portal will retian historical information of the transactions.

3 Claims, 10 Drawing Sheets

XSD Example 1

XSD Example 2

Basic Shopping Cart

FIG. 5

More Information Screen on Integrated Shopping Cart

XLS Example

FIG. 8

Portal Mockup Screen

**Made to Specification
XSD Maintenance**

FIG. 11

SYSTEM AND METHOD FOR A MADE TO SPECIFICATION E-COMMERCE QUOTING AND ORDERS PROCESSING SYSTEM ON A STAND ALONE OR INTEGRATED PORTAL

TECHNICAL FIELD OF THE INVENTION

The present invention concerns sales configuration information management of e-commerce processing and storage of specifications in general with or without options. More specifically, the present invention concerns the sales configuration management implementation to allow dynamically generated questions without the questions being a unique table for each product family that are necessary for quoting the selling price.

The present invention concerns the portal operation between prospect desiring to get price quotes and the vendor e-commerce web site, with the ability to place the order with the desired vendor.

The present invention concerns with integrating real time graphic design within e-commerce.

The present invention concerns unique searching ability of the product specifications to find the applicable product family on the portal.

BACKGROUND AND RELATED ART

In the following, the term "e-commerce" should be broadly interpreted and may include content such as Web pages, text files, multimedia files, object features, link structure, etc.

There are a number of terms requiring definition that are at the core of the existing methodologies. XSD is defined as a library that provides an API for manipulating the components of an XML Schema. This is as described by the W3C XML Schema specifications, as well as an API for manipulating the DOM-accessible representation of XML Schema as a series of XML documents, and for keeping these representations in agreement as schemas are modified.

The Extensible Stylesheet Language Family (XSL) XSL is a family of recommendations for defining XML document transformation and presentation.

The Real time Scalable Vector Graphic (SVG) is the capability to dynamically add graphic components into the database while linking the graphics to specific costing related items.

E-Commerce of Parts to Specification or Stocked in Inventory for E-Commerce

On the Internet, the World Wide Web (referred to as "the Web") e-commerce sites exist for inventory and made to specification. Most sites today that sell to options have a form where the prospect has to describe what it is that they want by answering the questions in the spaces provided. This general form for a broad based product line leads to many iterations back and forth before the specification can be determined as to what will be the final quoted price.

Problems Raised by Present E-Commerce Solutions

A programmer can write hard code to ask the option questions for each product family in the database but when new product families are added or prices change only the programmer can make the changes.

When parts are stocked in inventory there is no easy retrieval of the specification as to how the product was made.

Known Techniques for Product Specifications in E-Commerce

Some previous e-commerce techniques exist such as the Universal Description, Discovery and Integration (UDDI). However, it only publishes the Web Services Default Language (WSDL) for a company for there product line and does not go down to each product family specification.

Some portals have arrangements with e-commerce web site where they display prices of inventory items but do not address products that are made to specification.

There are numerous patents already granted for e-commerce and electronic shopping carts. For example, Kenny in U.S. Pat. No. 6,381,583, teaches how to make an interactive shopping mall in a virtual representation. This does not however, handle the made to specification problems as presented. In U.S. Pat. No. 6,167,383, Henson teaches how sell computer system with various user selections using an online shopping cart system. However, it does not handle the made to specification problems. This would require knowing how the product was made or special shipping instructions and host of other product specific information.

Therefore, it is desirable to provide an interactive capability to dynamically determine a quoted price without the requirement of multiple query iterations between the buyer and seller for made to specification products.

It is also desirable to have such capability without the need of a computer programmer and to be able to modify and add new products easily.

SUMMARY OF THE INVENTION

The present invention is directed to a process that allows for traversing the industry standard XSD tree to display to the user option questions for input data to the algorithm by:
  (i) each element to be a question supplied to the user,
  (ii) each element will have allowed input rules,
  (iii) each element will have optional administrator supplied error messages when the rules fail,
  (iv) each element can be checked for other option selection capability.

The present invention may function on the internet, intranet, or local client server mode.

The present invention has several advantages over the prior art of traversing files to determine applicable programmed questions. One advantage is the relationships that are defined in the XSD file. This includes items such as the minimum and maximum values, inclusion or exclusion, exact or pattern matching.

Another advantage of the present invention is the XSD file being used to determine format of input questions as one of the following: decimal, integer, float, string and drop down values.

Yet another advantage of the present invention is the information for the selection options is internally stored as an XML document in a single database table.

Still another advantage of the present invention is the user-defined computation of interim steps to determine the final selling price, shipping cost, and sales tax.

Still another advantage is the integrated real time graphic design capability to build and integrate graphic components directly into the database.

It is therefore an object of the present invention to provide a method and apparatus that uses XSD file contents to dynamically determine presentation data to the user.

It is another object of the invention to provide a method and apparatus to allow administration of the XSD and XSL files containing the questions, edits and associated math calculations.

It is yet another object of the present invention to provide a method and apparatus to provide a search capability of the entire database containing both static inventory components and made to specification components.

It is yet another object of the present invention to provide a method and apparatus to provide an integrated real time graphic design capability to build and integrate graphic components directly into the database.

The foregoing and other objects, features and advantages of the invention will be apparent from the following more particular description of a preferred embodiment of the invention. This is illustrated in the accompanying drawings wherein like reference numbers represent like parts of the invention.

BRIEF DESCRIPTION OF THE DRAWINGS

FIG. 5 is a screen example of stand alone e-commerce shopping cart that illustrates some operations that may be performed by the present invention.

Figure 8:
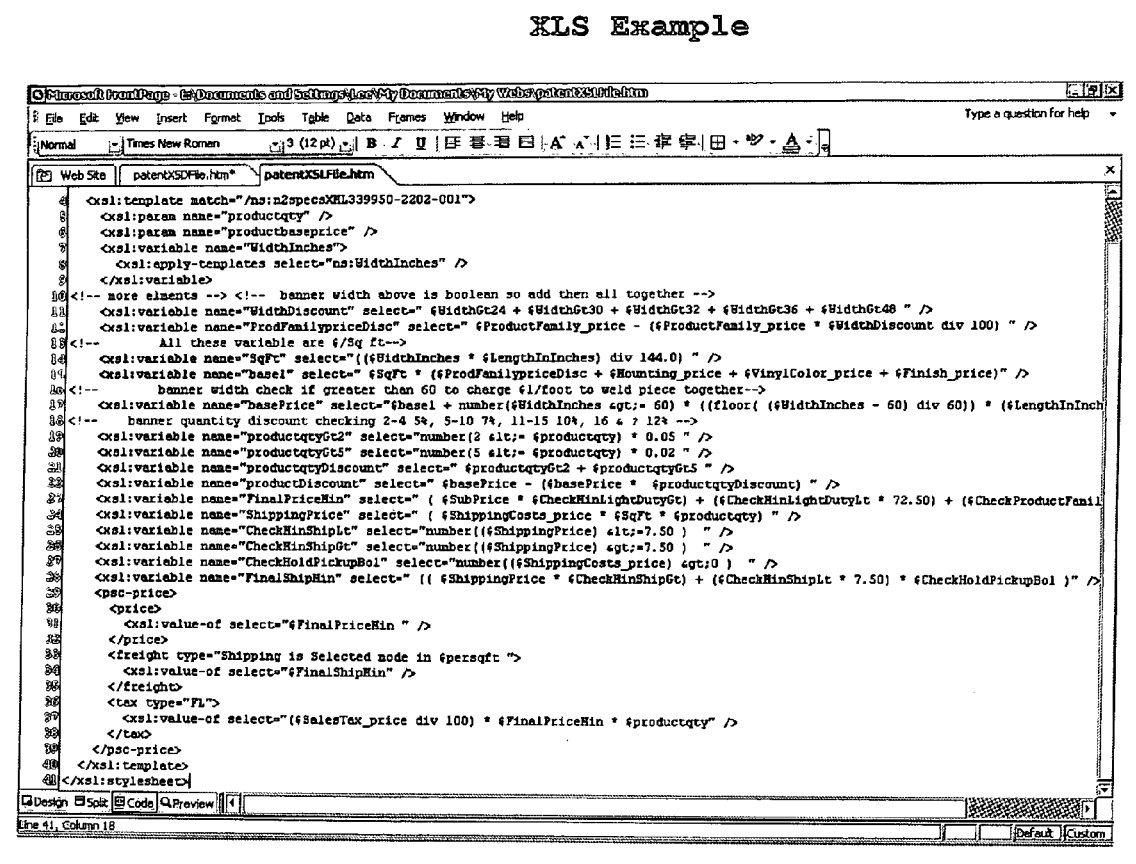

FIG. 8 is an example of XSL file format that illustrates some operations that may be performed by the present invention.

FIG. 11 is an example of XSD maintenance that illustrates some operations that may be performed by the present invention.

DETAILED DESCRIPTION

Figure 1:
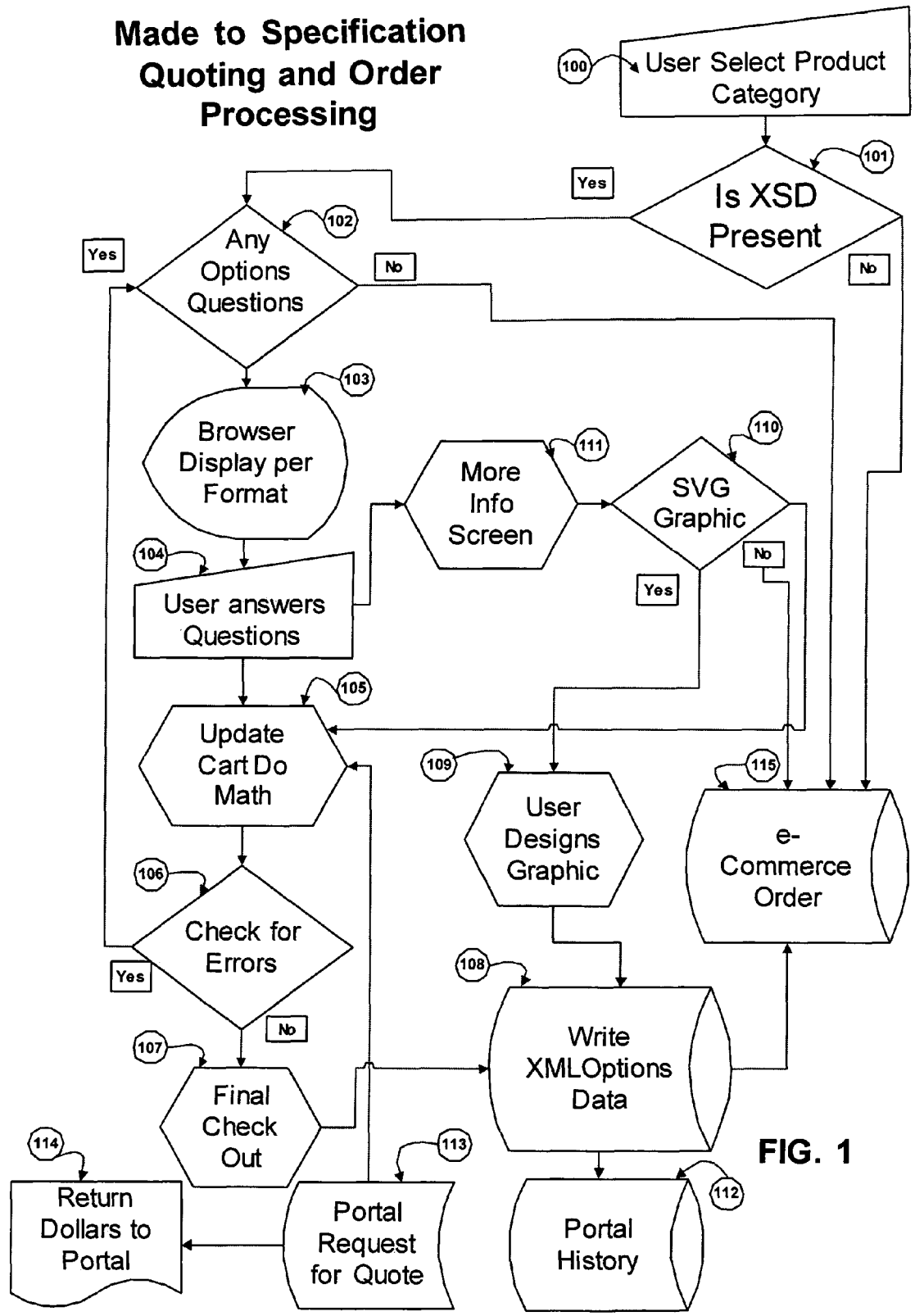
FIG. 1 is a high-level block diagram of the e-commerce logic flow chart in which at least some aspects of the present invention may be used.
Figure 5:
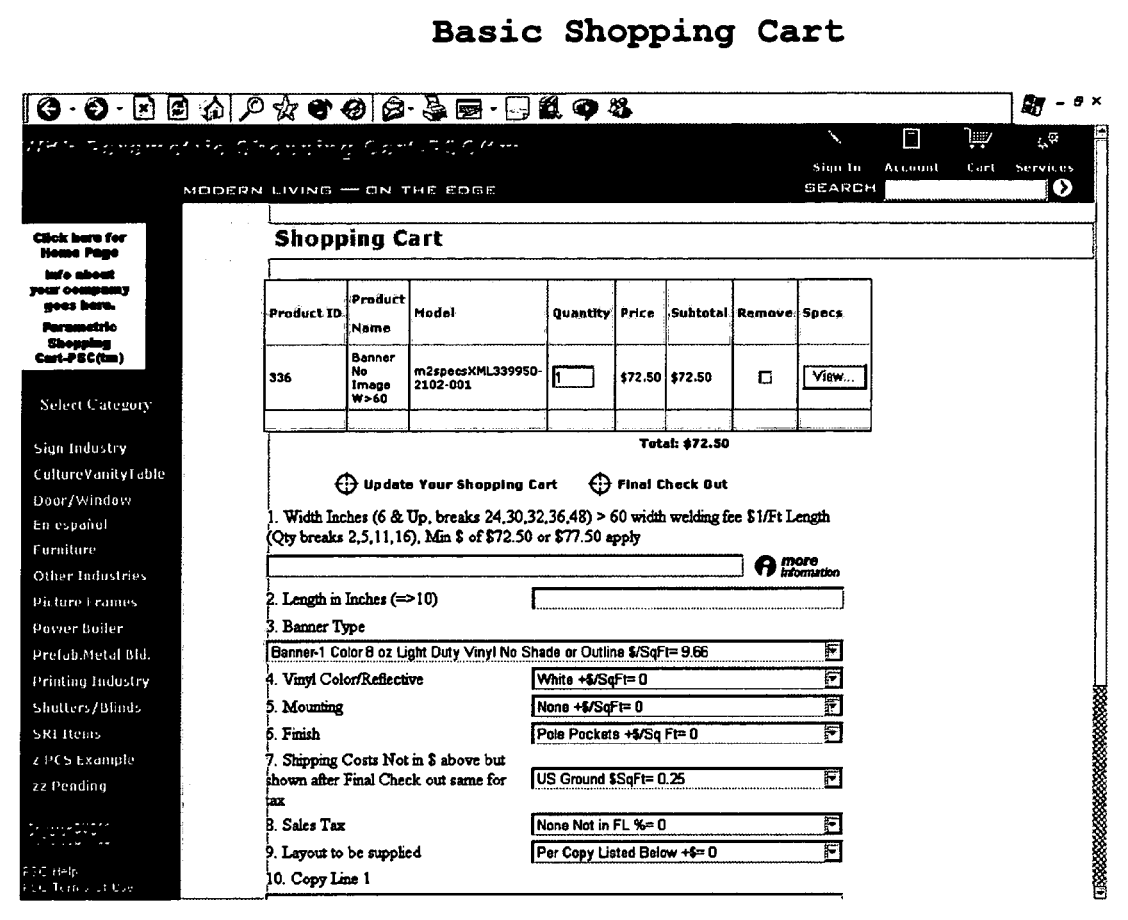

Referring now to FIG. 1, a prospect looking for product prices begins at 100 with a web browser. The prospect selects the product category from the menu on the left as shown in FIG. 5. The system logic flow at 101 checks to see if a XSD file is present for the product selected and if NO goes to step 115. If the answer to the query in step 101 is yes then proceed to step 102. The system confirms the XSD is present on the server and if so presents to the browser screen per format as defined in step 103 also shown in FIG. 11 field 1101. The prospect answers the questions in step 104. At any type during the process illustrated in step 104 the prospect has the ability to click on the More Info button step 111 and as shown in FIG. 5 to see more words & diagrams about the questions. A unique aspect of this invention is the costing of the made to specs product along with the Real Time Scalable Vector Graphic (SVG) design of images in step 110. If it is not SVG then they proceed to step 105. If it is SVG then in step 109 the prospect designs the new graphic and then in step 108 additional processing is done. Subsequently, a Portal History is recorded in step 112.

Once the prospect has completed all of the questions in step 104 they can select Update the Cart in step 105. The system checks for any errors in step 106 and if any errors are found, displays an error message and sends the logic flow back to step 102. Normal processing without any errors allows the user to select step 107 if no more products are to be placed on this order.

The system supports Portal input of Request For Quote at 113 from web services. The processing here is input of a XML file that has already passed edits therefore pricing is done and checking to see if the selected options are available from this vendor. The results are sent back to the portal in 114.

Figure 11:
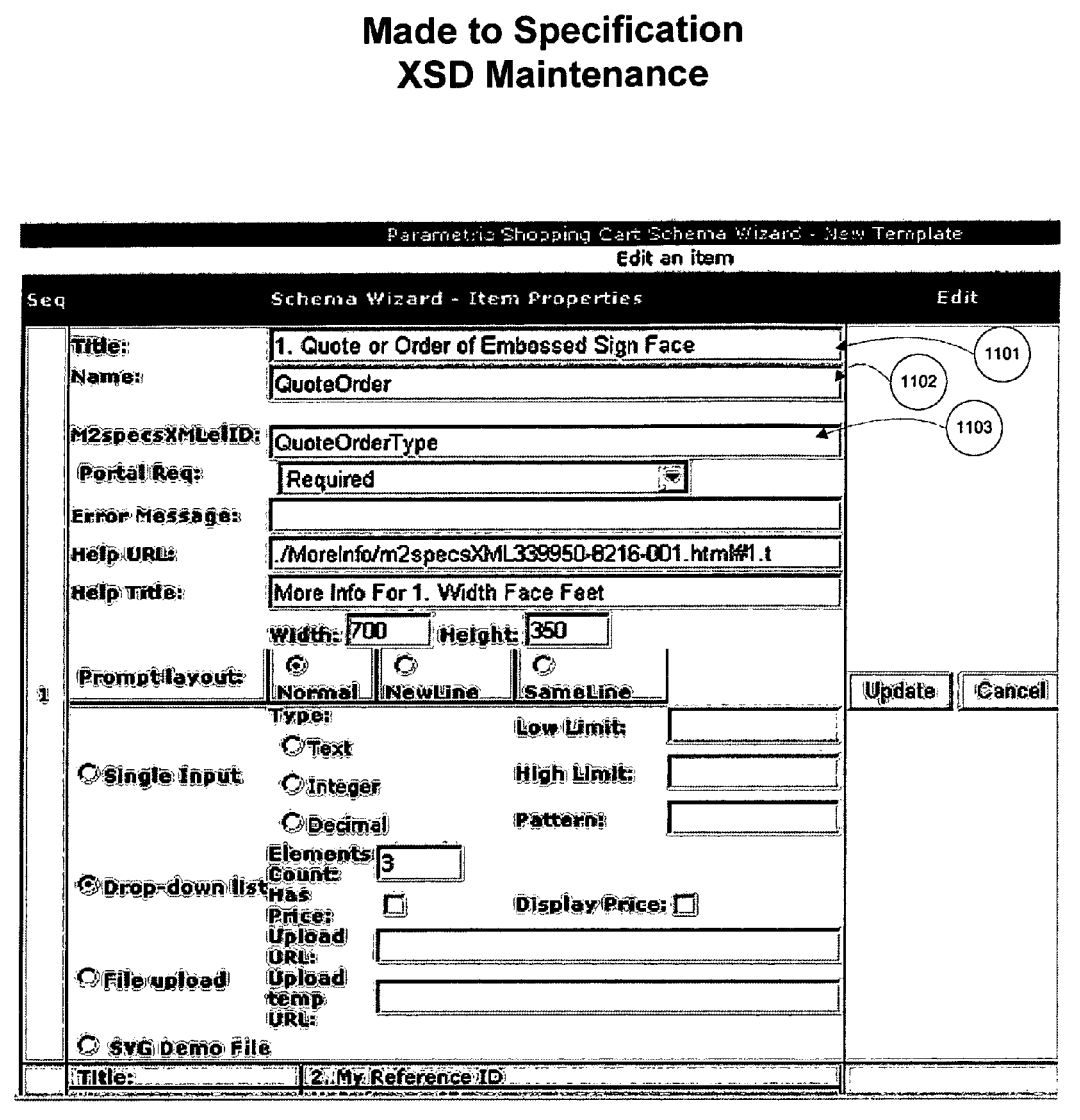

The logic at 108 then writes the option answers and the Name in FIG. 11 1102 to the single table for later retrieval. If the request come from a portal in 113 then in 112 history of the transaction is written.

The logic after step 108 is to process the prices into an order/quote as in step 115. Back in steps 101/102 the XSD can be present and no options questions are allowed in step 102 for a made to inventory product therefore the logic goes directly to step 115. A product may not have the XSD yet defined so the logic flow from step 101 goes directly to step 115.

Figure 2:
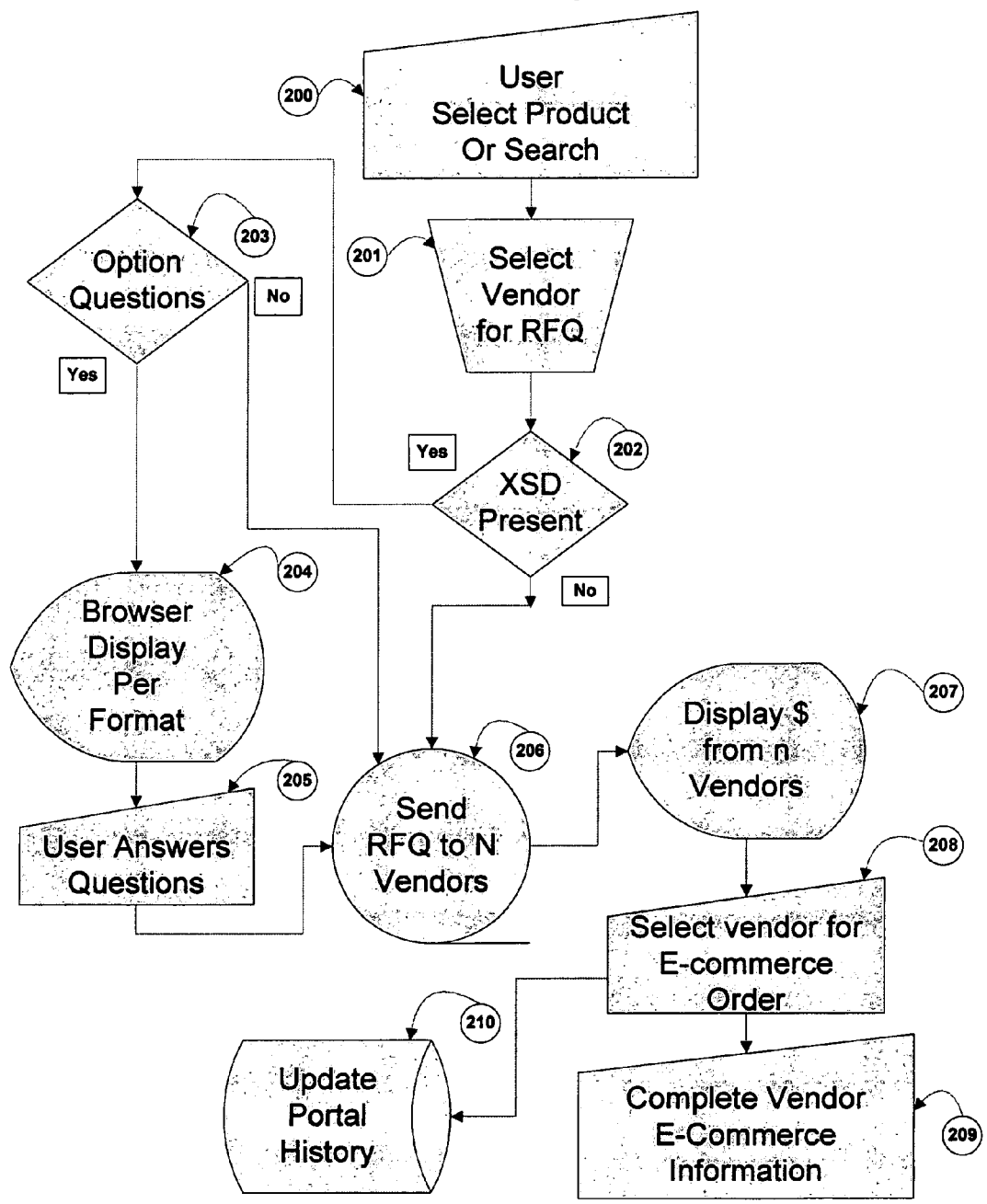
FIG. 2 is a high-level block diagram of the e-commerce Portal logic flow chart in which at least some aspects of the present invention may be used.
Figure 3:
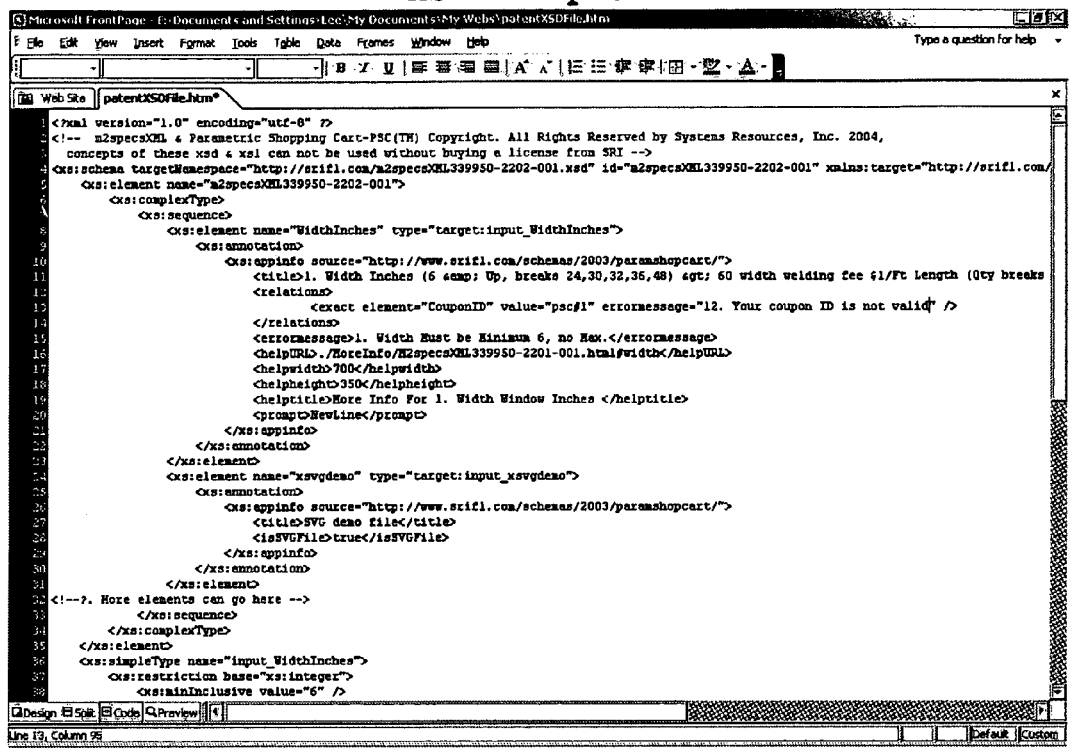
FIG. 3 is an example of XSD file format that illustrates some operations that may be performed by the present invention.
Figure 4:
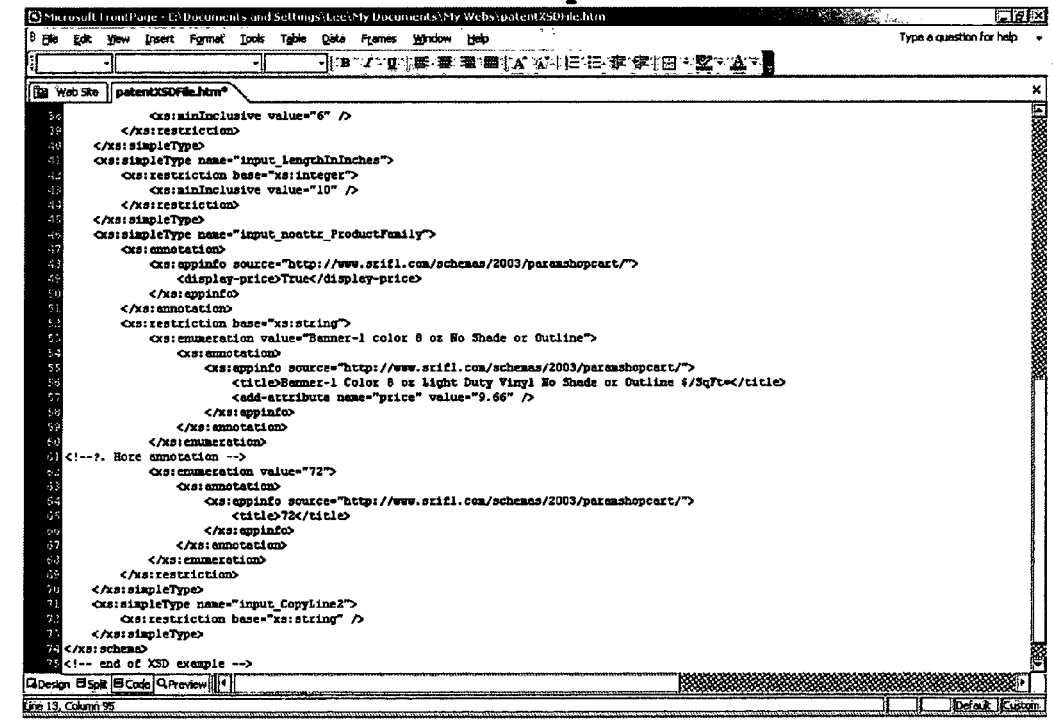
FIG. 4 is a continuation of FIG. 3 example of XSD file format that illustrates some operations that may be performed by the present invention.
Figure 6:
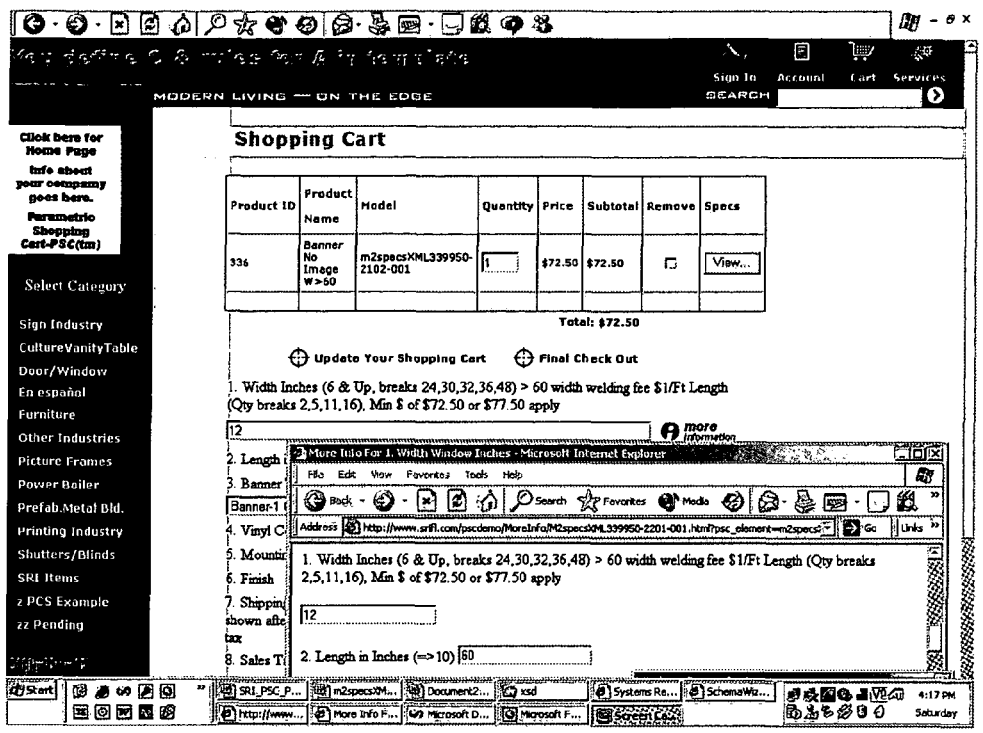
FIG. 6 is a screen example of stand alone e-commerce shopping cart with the More Information that illustrates some operations that may be performed by the present invention.
Figure 7:
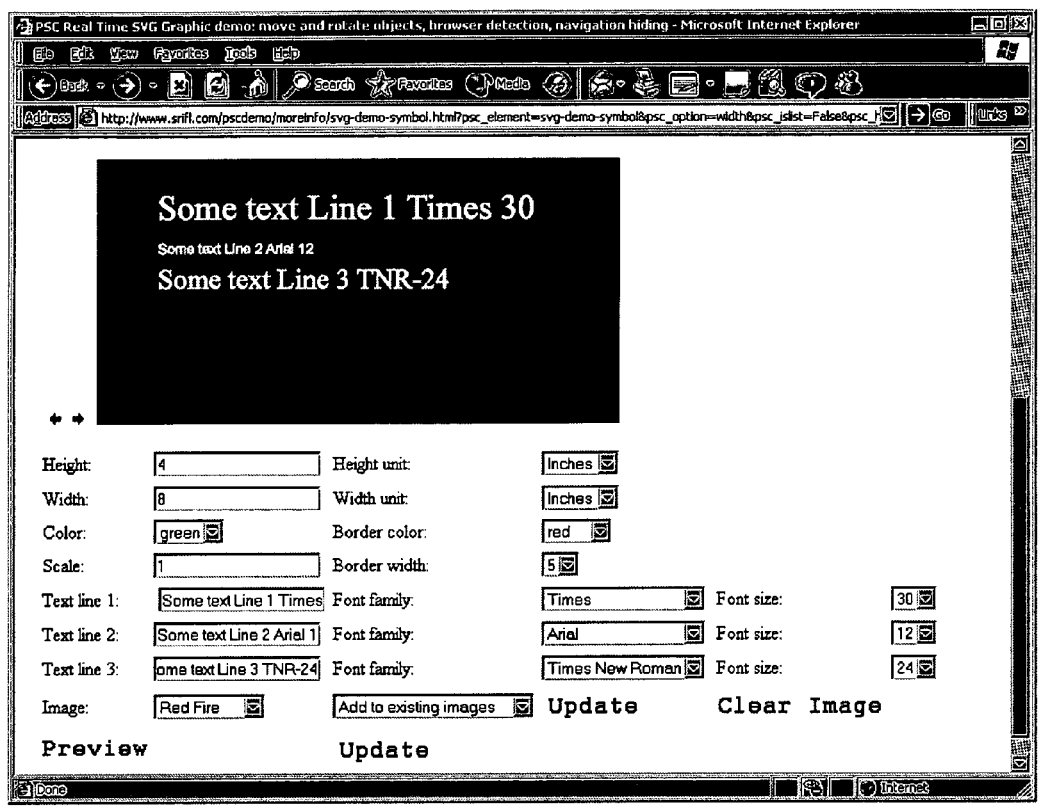
FIG. 7 is a screen example of stand alone e-commerce shopping cart with the Real Time Graphic design More Information that illustrates some operations that may be performed by the present invention.
Figure 9:
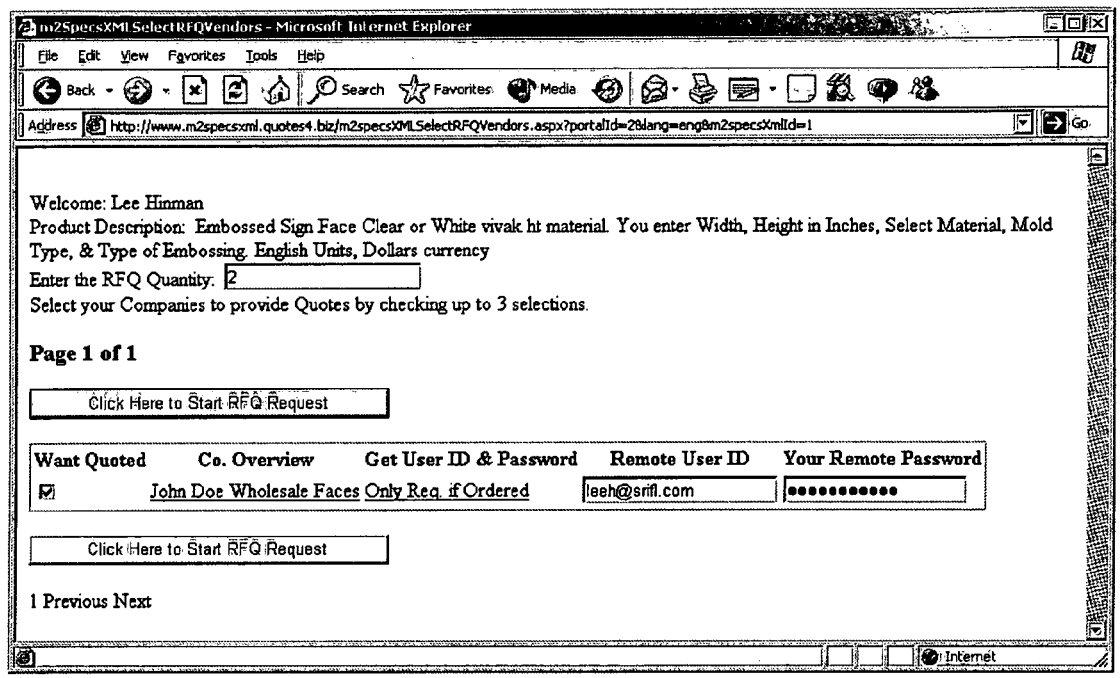
FIG. 9 is an example of Portal that illustrates some operations that may be performed by the present invention.
Figure 10:
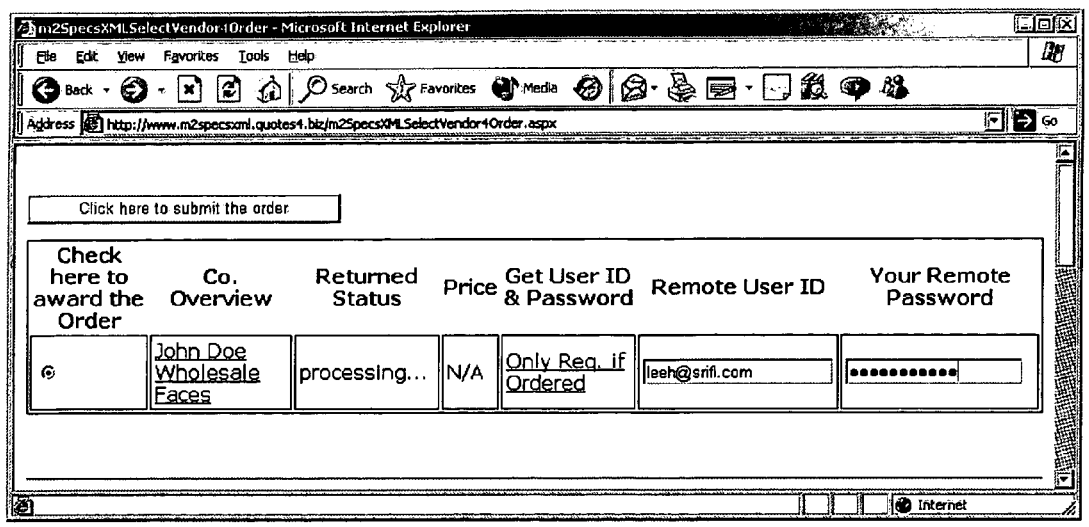
FIG. 10 is an example of Portal where the Vendor is selected that illustrates some operations that may be performed by the present invention.

Referring now to FIG. 2 in which is a prospect looking for prices from different vendors on a product is the starting point at step 200 with a web browser. Logic within step 200 checks to see if this prospect has requested this product within the last X days and only proceeds if true. This is to prevent abuse to portal to get an unreasonable number of quotes. The prospect selects the vendors (up to an allowed number) that they want the RFQ sent to in step 201 also as shown in FIG. 9 (note the step 201 selection could be before step 206). The system logic flow at step 202 checks to see if a XSD file is present for the product selected and if NO goes to step 206. If yes then proceed to step 203. The system confirms the XSD is present on the server and if so presents to the browser screen per format as defined in step 204. The prospect answers the questions in step 205. The system logic in step 206 sends the RFQ to ones selected in step 201 with web services which is step 113 in FIG. 1. Upon receipt back from the Web Services in step 207 the prices is shown from the vendors. The prospect selects the vendor they want to award the order to in step 208. The system portal updates its history in step 210. The user continues on to the vendor site in step 209 to complete the credit card processing if applicable.

The foregoing disclosure and the content of the drawings are merely illustrative of the principals of this invention and are not to be interpreted in a limiting sense.

What is claimed:

1. A method for facilitating quotes/orders involving interchange between a plurality of vendors and a plurality of users through a portal by using an E-commerce Engine for quotes/orders so a vendor connected on the internet or intranet with a web site can present selectable options said method comprising the steps of:

uploading, by the plurality of vendors, data including at least one XSD, each XSD corresponding to one product, each product including at least one element, each element including at least one sub-element, each sub-element including at least one variable, each variable including at least one attribute of the product;

selecting, by the user, a product category;

determining, by the portal, than an XSD is present for the selected product category;

retrieving, by the portal, the at least one product attribute by parsing each element and sub-element in the XSD;

displaying, by the portal, at least one screen including a plurality of product option questions, each product option question corresponding to at least one product attribute and corresponding a plurality of attribute values, said attribute values displaying drop-down menus and data fields, said data fields having formats including numeric, alpha-numeric and drop-down fields;

displaying, by the portal, a primary screen, said primary screen including at least one of an additional information screen and an SVG screen to permit the user to enter data, and updating the primary screen after the user leaves each field;

generating, by the portal, a real-time graphic image based on a user drawn SVG image on said SVG screen;

adding, by the user, at least one image related to the product, said image selected from a stored graphic image and the real-time user drawn SVG image;

answering, by the user, the product option questions;

In response to clicking on a more info button, displaying additional information for a selected attribute;

reiteratively updating, by the user, said answers and said SVG image;

reiteratively validating input, by the portal, wherein said validating includes comparing the answers to data uploaded by said vendors in said XSD;

cross-checking, by the portal, each sub-element and checking for errors per predefined rules, said validation including validating an acceptable range wherein said checks include specifying regular expression patterns according to other fields in the XSD;

confirming, by the portal, that the selected options are available from the specified vendors, wherein said confirming step is based on review of a plurality of element definitions submitted by the plurality of vendors as XSD;

computing, by the portal, based on the XSD for the product, a cost for the product, said cost including product selling price, shipping cost, taxes, discounts;

formatting, by the portal, said answers into XML;

writing, by the portal, the user answers in XML format into a single table and into portal history storage;

displaying, by the portal, the list of vendors with price for a desired combination of elements for the product;

selecting, by the user, at least one vendor to place the order to and assigning, by the E-commerce engine, an order number and displaying the request for quotes;

transmitting, by the portal, a request for quotes to selected vendors, said request being based on the user answers;

receiving by the portal, responses to the request for quotes (RFQ), said responses including quoted/order cost amount;

formatting and displaying, by the portal, said responses from the vendors;

selecting, by the user, a response;

by the portal, liking the user to an e-commerce site of the vendor corresponding to the selected response to complete order payment.

2. A method for facilitating quotes/orders involving interchange between a plurality of vendors and a plurality of users through only an E-commerce Engine for quotes/orders so a vendor connected on the internet or intranet with a web site can present selectable options said method comprising the steps of:

uploading, by the plurality of vendors, data including at least one XSD, each XSD corresponding to one product, each product including at least one element, each element including at least one sub-element, each sub-element including at least one variable, each variable including at least one attribute of the product;

selecting, by the user, a product category;

determining, by the portal, than an XSD is present for the selected product category;

retrieving, by the portal, the at least one product attribute by parsing each element and sub-element in the XSD;

displaying, by the portal, at least one screen including a plurality of product option questions, each product option question corresponding to at least one product attribute and corresponding a plurality of attribute values, said attribute values displaying drop-down menus and data fields, said data fields having formats including numeric, alpha-numeric and drop-down fields;

displaying, by the portal, a primary screen, said primary screen including at least one of an additional information screen and an SVG screen to permit the user to enter data, and updating the primary screen after the user leaves each field;

generating, by the portal, a real-time graphic image based on a user drawn SVG image on said SVG screen;

adding, by the user, at least one image related to the product, said image selected from a stored graphic image and the real-time user drawn SVG image;

answering, by the user, the product option questions;

In response to clicking on a more info button, displaying additional information for a selected attribute;

reiteratively updating, by the user, said answers and said SVG image;

reiteratively validating input, by the portal, wherein said validating includes comparing the answers to data uploaded by said vendors in said XSD;

cross-checking, by the portal, each sub-element and checking for errors per predefined rules, said validation including validating an acceptable range wherein said checks include specifying regular expression patterns according to other fields in the XSD;

confirming, by the portal, that the selected options are available from the specified vendors, wherein said confirming step is based on review of a plurality of element definitions submitted by the plurality of vendors as XSD;

computing, by the portal, based on the XSD for the product, a cost for the product, said cost including product selling price, shipping cost, taxes, discounts;

formatting, by the portal, said answers into XML;

writing, by the portal, the user answers in XML format into a single table and into portal history storage;

displaying, by the portal, the list of vendors with price for a desired combination of elements for the product;

selecting, by the user, at least one vendor to place the order to and assigning, by the E-commerce engine, an order number and displaying the request for quotes;

transmitting, by the portal, a request for quotes to selected vendors, said request being based on the user answers;

receiving by the portal, responses to the request for quotes (RFQ), said responses including quoted/order cost amount;

formatting and displaying, by the portal, said responses from the vendors;

selecting, by the user, a response;

by the portal, linking the user to an e-commerce site of the vendor corresponding to the selected response to complete order payment.

3. A method for facilitating quotes/orders involving interchange between a plurality of vendors and a plurality of users through only a portal for quotes/orders so a vendor connected on the internet or intranet with a web site can present selectable options said method comprising the steps of:

uploading, by the plurality of vendors, data including at least one XSD, each XSD corresponding to one product, each product including at least one element, each element including at least one sub-element, each sub-element including at least one variable, each variable including at least one attribute of the product;

selecting, by the user, a product category;

determining, by the portal, that an XSD is present for the selected product category;

retrieving, by the portal, the at least one product attribute by parsing each element and sub-element in the XSD;

displaying, by the portal, at least one screen including a plurality of product option questions, each product option question corresponding to at least one product attribute and corresponding a plurality of attribute values, said attribute values displaying drop-down menus and data fields, said data fields having formats including numeric, alpha-numeric and drop-down fields;

displaying, by the portal, a primary screen, said primary screen including at least one of an additional information screen and an SVG screen to permit the user to enter data, and updating the primary screen after the user leaves each field;

generating, by the portal, a real-time graphic image based on a user drawn SVG image on said SVG screen;

adding, by the user, at least one image related to the product, said image selected from a stored graphic image and the real-time user drawn SVG image;

answering, by the user, the product option questions;

In response to clicking on a more info button, displaying additional information for a selected attribute;

reiteratively updating, by the user, said answers and said SVG image;

reiteratively validating input, by the portal, wherein said validating includes comparing the answers to data uploaded by said vendors in said XSD;

cross-checking, by the portal, each sub-element and checking for errors per predefined rules, said validation including validating an acceptable range wherein said checks include specifying regular expression patterns according to other fields in the XSD;

confirming, by the portal, that the selected options are available from the specified vendors, wherein said confirming step is based on review of a plurality of element definitions submitted by the plurality of vendors as XSD;

computing, by the portal, based on the XSD for the product, a cost for the product, said cost including product selling price, shipping cost, taxes, discounts;

formatting, by the portal, said answers into XML;

writing, by the portal, the users answers in XML format into a single table and into portal history storage;

displaying, by the portal, the list of vendors with price for a desired combination of elements for the product;

selecting, by the user, at least one vendor to place the order to and assigning, by the E-commerce engine, an order number and displaying the request for quotes;

transmitting, by the portal, a request for quotes to selected vendors, said request being based on the user answers;

receiving by the portal, responses to the request for quotes (RFQ), said responses including quoted/order cost amount;

formatting and displaying, by the portal, said responses from the vendors;

selecting, by the user, a response;

by the portal, linking the user to an e-commerce site of the vendor corresponding to the selected response to complete order payment.

\* \* \* \* \*